Aug. 9, 1960 I. R. KREMER ET AL 2,948,442
SHIRT CONVEYOR
Filed April 17, 1959 2 Sheets-Sheet 1
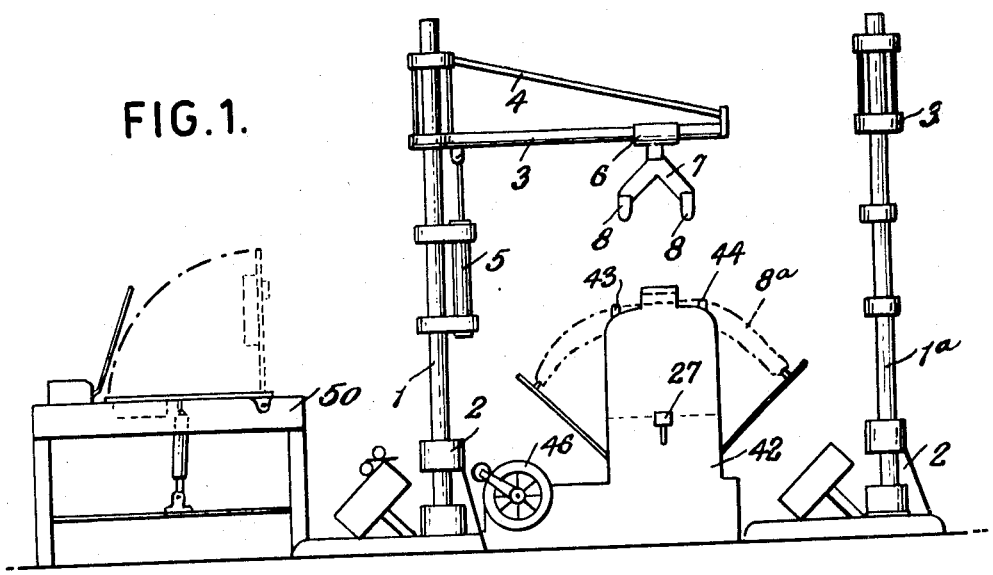
FIG. 1.
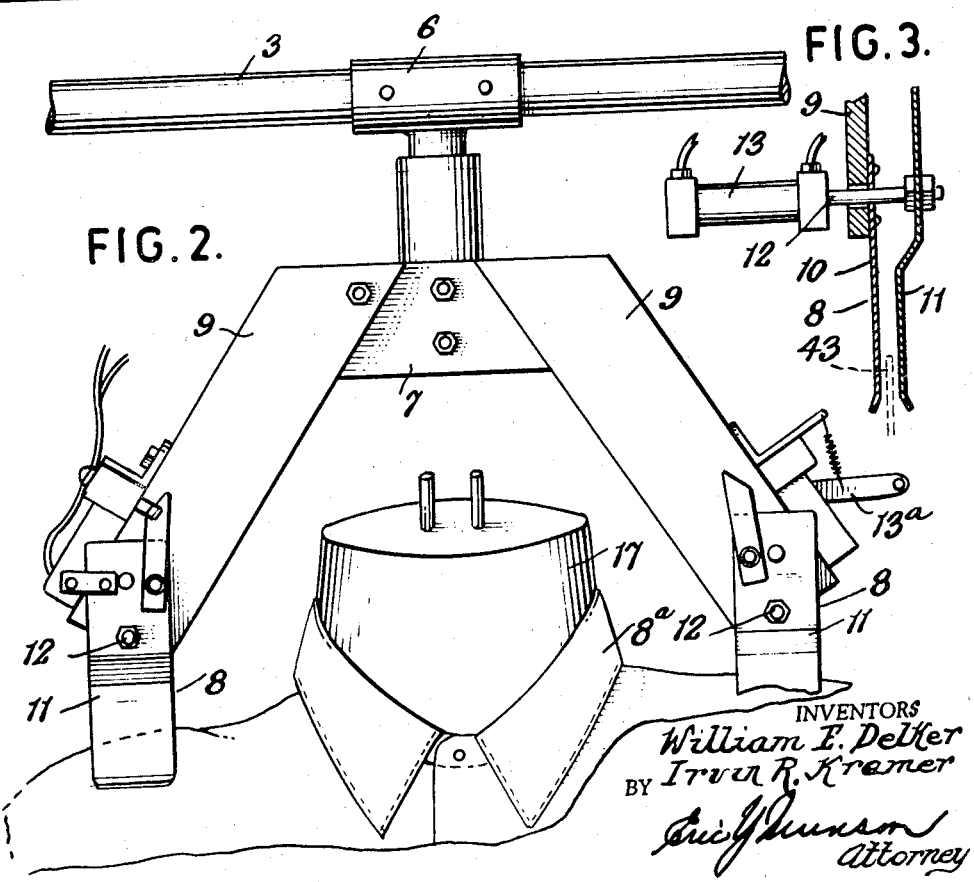
FIG. 2.
FIG. 3.
INVENTORS
William F. Dekker
BY Irvin R. Kremer
Eric J. Munson
Attorney Aug. 9, 1960                I. R. KREMER ET AL            2,948,442
                                SHIRT CONVEYOR
Filed April 17, 1959                                      2 Sheets-Sheet 2
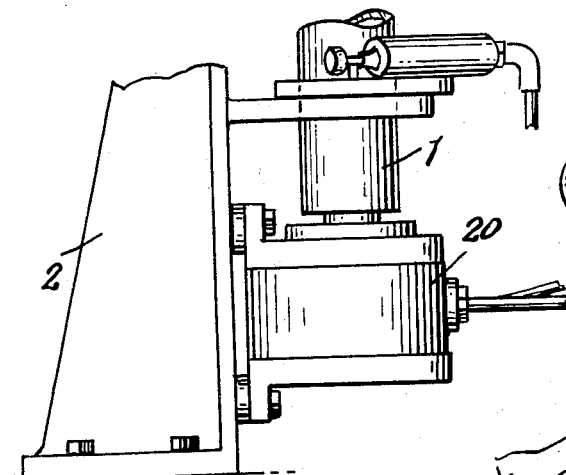
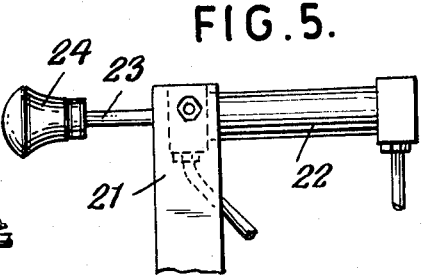
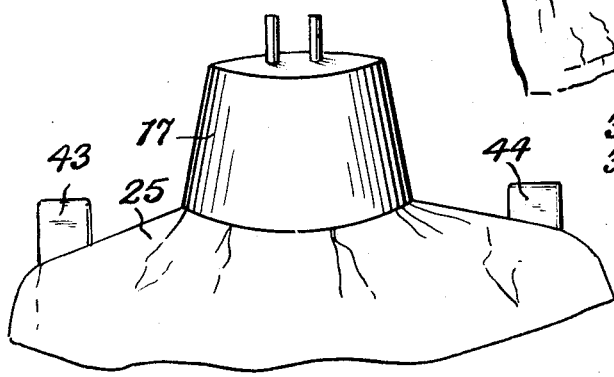
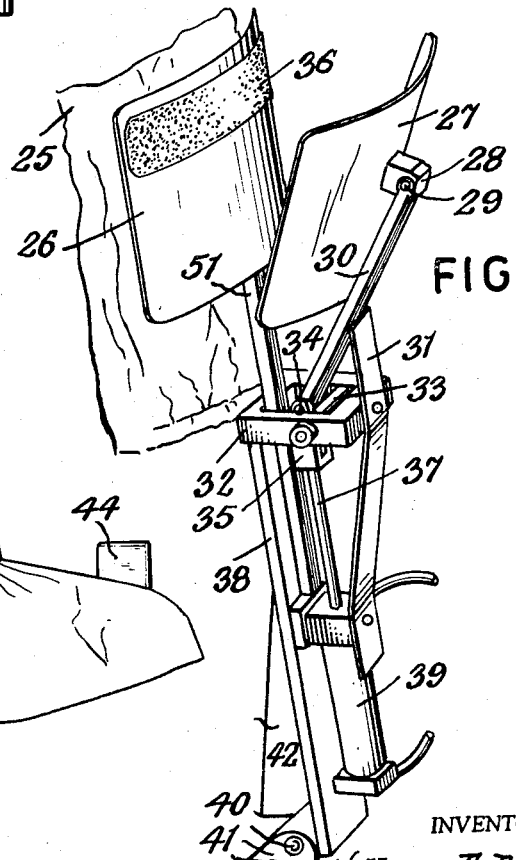
INVENTORS
William E. Delker
BY Irvin R. Kremer
Attorney

United States Patent Office 2,948,442
Patented Aug. 9, 1960

2,948,442
SHIRT CONVEYOR

Irvin R. Kremer, Schuylkill Haven, and William E. Delker, Pottsville, Pa., assignors to Phillips-Van Heusen Corporation, New York, N.Y., a corporation of New York Filed Apr. 17, 1959, Ser. No. 807,183
10 Claims. (Cl. 223—57)

This invention relates to an apparatus for handling and conveying shirts or similar articles, and more particularly to means by which the garments can be brought to and put on and/or removed from a pressing device and transported to a point where they are folded or otherwise operated on.

In the preparation of shirts for boxing or wrapping, the unfinished shirts are usually manually fitted over an inflatable pressing device or form on which they are subjected to the action of air under pressure or steam or both, and which gives a finished appearance to the shirts. The dried shirts are then removed from the form and are carried to a point where they are folded or possibly subjected to other operations preparatory to being enveloped, wrapped or boxed. All of the above operations are usually performed manually and hence involve considerable time and expense.

It is an object of the present invention to provide an apparatus which can bring a shirt to a pressing device and place it thereon to subsequently remove it from the device, or which can be used to merely lift the treated shirt from the press and carry it to a remote point at which it will be released for folding or for other operations. It is an object of the invention to provide an apparatus of the above-mentioned character and which will expedite the transporting of a shirt and eliminate the manual carrying of the shirts to and from the press.

With these and other objects to be hereinafter set forth in view, we have devised the arrangement of parts to be described and more particularly pointed out in the claims appended hereto.

In the accompanying drawings, wherein an illustrative embodiment of the invention is disclosed, Fig. 1 is a view of an apparatus constructed according to the invention;

Fig. 2 is a front elevational view of the shirt-gripping means;

Fig. 3 is a sectional view, in simplified form, of one of the grippers;

Fig. 4 shows the pneumatic motor for rotatively moving the vertical shaft or post;

Fig. 5 shows the front clamp for engagement against one of the tails of the shirt when the shirt is placed on the form or pressing device;

Fig. 6 is a perspective view of the rear clamp for holding down the rear tail of the shirt, and Fig. 7 is a front elevational view of the upper part of the form or pressing device.

In Fig. 1 of the drawing, 42 indicates generally the form or pressing device for the shirts. Said form includes a bag-like covering 25 which, during the operation of the press, is inflated by air pressure and steam or either. The blower shown at 46 acts to inflate the covering in the manner known in this art. The shirt 8a to be subjected to the pressing operation, is manually or mechanically fitted on the form, with the neck portion 17 of the form protruding from the collar of the shirt substantially as shown in Fig. 2.

The means for engaging a shirt while it is on the form 42 and lifting it therefrom, and carrying it to a remote point, such as to the folding table 50 (Fig. 1), includes a vertical shaft or post 1, mounted for rotative movement in suitable bearings in the supporting bracket 2. A pneumatic motor shown at 20 in Fig. 4, is operative to rotatively move the shaft 1 to a predetermined extent around a vertical axis and as determined by suitably-positioned limit switches.

Secured on the shaft or post 1 is a radially-extending arm 3, braced as shown at 4 and provided with an adjustable sleeve 6 that supports shirt-gripping means generally indicated at 7. Said shirt-gripping means generally includes the divergent arms shown at 9, each of which is provided with a gripping device 8 at its lower end. Each of the gripping devices includes a fixed jaw 10 secured to the arm 9 (Fig. 3) and a movable jaw 11, the latter being secured on a piston rod 12 of the pneumatic cylinder 13, shown in Fig. 3 as separate from the arm 9, but which is actually carried by the arm.

When the shirt 8a is fitted over the form or pressing device 42, and over the inflatable covering 25 thereon, the shoulder portions of the shirt come to rest upon two upwardly-projecting, smooth-surfaced lugs shown at 43 and 44. These lugs facilitate the engagement of the jaws 10 and 11 of the grippers 8 with the shirt, as will be presently explained. In fitting the shirt over the form or pressing device, the back tail of the shirt is engaged by a clamp shown in Fig. 6, and which includes a fixed arcuate jaw 26 provided on its outer or convex face with a non-slip surfacing 36. Said fixed jaw is mounted at the upper end of a supporting bar 51 secured on plate 38 that is pivotal at its lower end, as indicated at 40, in lugs 41 extending from the face of the form 42. The movable jaw of the clamp is shown at 27 and the same is also of arcuate form, thus causing it to conform to the shape of the fixed jaw 26 so that when a shirt tail is inserted between the jaws 26 and 27 and the movable jaw is moved toward the fixed jaw, the shirt tail will be gripped and will be drawn downwardly.

The movable jaw 27 is provided on its outer face with a projecting lug 28, pivoted at 29 in a clevis on the upper end of a link 30 which has its lower end pivoted at 34 in a clevis 35 on the upper end of a piston rod 37 extending from the pneumatic cylinder 39. The link 30 is guided by a roller 33 rotatively mounted in a bracket 32 secured at the upper end of the plate 38.

The above-described clamp arrangement is such that the pneumatic cylinder is operative to move the jaw 27 toward the jaw 26 and to enable the shirt tail to be gripped as above explained. The strip member shown at 31 forms a stop to limit the movement of the jaw 27 to the released position shown in Fig. 6.

The front shirt tail is engaged and is held against the surface of the form 42 by means of a plunger device shown in Fig. 5. The same includes a rigid support 21 on which a pneumatic cylinder 22 is mounted. The piston rod 23 of the cylinder 22 carries a cushion member 24 at its free end, which cushion member may consist of a rubber tip.

From the foregoing, the operation of the apparatus will be readily understood. When the garment 8a is placed over the press 42 the front tail is disposed in front of the clamp shown in Fig. 5, and the back tail is inserted between the jaws 26 and 27 of the clamp shown in Fig. 6. The controls effecting operation of the pneumatic cylinders 22 and 39 are now operated and these cylinders respectively actuate the clamps to cause the tails of the shirt to be held, and with a slight downward pull exerted on the rear tail. As the clamps move into shirt-engaging positions, the pressing cycle is started and the bag 25 inflated and the shirt pressed and dried. Upon completion of the pressing cycle, the clamps at the front and rear of the shirt are opened to release the shirt tails, and as the clamp 24 recedes, it is arranged to operate a switch which energizes a pneumatic cylinder 5 (Fig. 1) that causes a lowering movement of the arm 3 to bring the grippers 8 down to a position to engage the shirt and grip it substantially as shown in Fig. 2. When the arm 3 is lowered as above described, the parts of the shoulders of the shirt that are resting on the lugs 43 will enter between the jaws 10 and 11 and the cylinders 13 are then energized to cause jaws 11 to be moved toward jaw 10 and the shirt accordingly gripped between the jaws 10 and 11. The pneumatic cylinder 5 is then energized to raise the arm 3 to a height controlled by a limit switch and the raising movement of the arm 3 will remove the shirt from off the form or pressing device. When the required height is reached by the arm, the motor 20, which may be hydraulically or pneumatically operated, will rotate the shaft 1 the required distance to bring the shirt to a point of discharge. When this point is reached, the garment can be released from the grippers 8 by a switch 13a which energizes the cylinders 13 in a manner to cause the jaws 11 to move away from jaws 10. As the grippers are caused to release the shirt as above described, the cylinder 5 raises the arm 3 to a height where a limit switch operates to cause energization of the motor 20 and resultant swing of the shaft 1 to bring the arm 3 into position above the form or pressing device 42. The point at which the pressed shirt is discharged can be the point of location of the folding table 50 or at some other desired point.

In the arrangement shown in Fig. 1, a post 1a is shown, and the same is similar in construction to the post 1. The post 1a can be used to deliver shirts to position over the form and caused to deposit them thereon, while the post 1 is at the point of delivery of a pressed shirt, as for example, at the folding table 50. Post 1a will then be swung back to its initial position to receive another shirt, while post 1 comes to position above the form 42 in readiness to remove the shirt that was placed thereon by the arm carried by post 1a. It is also possible to provide the post 1 or 1a with a plurality of radial arms, and have the posts or either of them revolving in a complete circle with stops at the points of pick-up and discharge of the shirts.

Also while the apparatus herein described is shown as being employed for conveying shirts from a pressing device to a point where folding of the shirts takes place, it will be apparent that the device may also be used for other purposes. For example, while we have herein described the apparatus as being applicable for use in transporting the pressed shirt away from the press at the conclusion of the pressing operation, it will be apparent that it can also be used for conveying an unpressed shirt to the press and fitting it thereon, or it might also be used to bring the shirt to the press, place it thereon and then remove it from the press and carry it away at the conclusion of the pressing operation. All of these functions are capable of performance by the described apparatus without material change therein.

Having described an embodiment of the invention, it is obvious that the same is not to be restricted thereto, but is broad enough to cover all structures coming within the scope of the annexed claims.

What we claim is:

1. A transporting device for shirts and similar garments comprising, a vertically-mounted pressing device on which a shirt is fitted, a rotatively-mounted vertical shaft, an arm extending radially from the shaft, shirt-gripping means carried by the arm, means for rotating the shaft to an extent to position the arm above a shirt located on the pressing device, means for vertically moving the arm to bring the gripping means thereon into gripping engagement with the shirt on the pressing device, means for operating the gripping means in a manner to cause them to grip the shirt, the arm-moving means being then effective to raise the arm and by such raising movement withdraw the shirt from the pressing device, the shaft-rotating means being then effective to rotate the shaft to an extent sufficient to move the arm to a position remote from the pressing device for shirt delivery.

2. A transporting device for shirts and similar garments comprising, a support on which a shirt is supported, a swinging member having gripping means for engaging the shirt at spaced points in the shoulder areas of the shirt, means for holding such areas of the shirt in elevated position to enable the shirt to be engaged by the gripping means, means for raising the swinging member and causing the gripped shirt to be lifted from off the support, and means for swinging said member while elevated to cause it to bring the shirt to a remote position for discharge.

3. A transporting device for shirts and similar garments as provided for in claim 2, and including projections provided on the support for elevating the shirt shoulder portions above the support to enable the said shoulder portions of the shirt to be engaged by the gripping means.

4. A transporting means for shirts and similar garments comprising, a vertically-mounted pressing device on which a shirt is fitted for pressing, a rotatively-mounted vertical shaft, an arm extending radially therefrom, shirt-grippers carried by the arm, means for rotating the shaft in a manner to position the arm above the pressing device, means for vertically moving the arm to bring the grippers thereon into gripping engagement with the shirt on the pressing device, means for operating the grippers in a manner to cause them to grip the shirt, the arm-moving means being then effective to raise the arm and by such movement lift the shirt from off the pressing device, the shaft-rotating means being then effective to rotate the shaft to an extent sufficient to move the arm to a position remote from the pressing device for shirt delivery, and means for causing opening of the grippers at said point for the release of the gripped shirt.

5. A transporting device for shirts and similar garments comprising, an inflatable vertically-mounted shirt-pressing device provided with a plurality of upwardly-directed projections on which a shirt is rested, a vertical post and means for rotating it to a limited extent, an arm carried by the post and caused to be positioned over the shirt at the limit of rotative movement of the post in one direction, grippers carried by the arm, each gripper including a fixed jaw and a movable jaw and adapted to engage between them the portions of the shirt that are arranged over the projections, and means for elevating the arm to cause it to remove the shirt from the pressing device after the shirt is grippingly engaged by the grippers.

6. A transporting device for shirts and similar garments comprising, a vertically-mounted shirt press, a vertical shaft capable of a rotative movement, an arm carried by the shaft, shirt-grippers carried by the arm, means for opening and closing the grippers, means for rotating the shaft to bring the arm to a position above a shirt on the press, means for lowering the arm to bring the grippers into engagement with the shirt and for thereafter raising the arm to cause the gripped shirt to be lifted off the press.

7. In a transporting device for shirts and similar articles as provided for in claim 6, wherein the press is provided with clamps for engagement with the front and rear tails of a shirt while the shirt is supported on the press, and means for releasing said clamps before engagement of the shirt by the grippers.

8. In a transporting device for shirts and similar garments, an inflatable vertically-mounted shirt press, clamping means at the front and back of the same for engagement with the tails of a shirt placed on the press, a vertical post provided with a radially-extending arm, means for rotatively moving the post, means for raising and lowering the arm relatively to the post, shirt grippers carried by the arm and adapted to grip a shirt on the press when the arm is positioned above the press and is in a lowered position, the means for raising and lowering the arm being effective to raise the arm after the shirt is gripped by its grippers and to cause the shirt so gripped to be lifted from off the press, the arm-rotating means being then effective to swing the arm to locate the shirt carried by it in a position for removal from the grippers, and means effective in said position to cause opening of the grippers.

9. An apparatus of the character described comprising a pressing station and a folding station, a swinging element carrying shirt-gripping means, means for swinging said element from the pressing station to the folding station, means for lowering the element when it is positioned above the pressing station to enable its grippers to engage a shirt at said station and raising the shirt so gripped, the swinging means being then effective to move the element, carrying the shirt, from the pressing station to the folding station.

10. A transporting device for shirts comprising, a vertically-mounted shirt press, a vertical shaft capable of rotative movement, an arm carried by the shaft, shirt grippers carried by the arm for engaging and carrying a shirt either to or from the press, means for rotating the shaft to bring the arm to a position above the press, and means for lowering the arm to cause it to either lower a shirt toward the press or lift a shirt therefrom, when it is raised.

References Cited in the file of this patent

UNITED STATES PATENTS

| | | |
|---|---|---|
| 1,569,819 | Lindsay et al. | Jan. 12, 1926 |
| 2,560,920 | Berger | July 17, 1951 |
| 2,812,070 | Delzer | Nov. 6, 1957 |